(12) United States Patent
Mickols et al.

(10) Patent No.: US 7,918,349 B2
(45) Date of Patent: **\*Apr. 5, 2011**

(54) COMPOSITE POLYAMIDE MEMBRANE WITH BRANCHED POLY(ALKYLENE OXIDE) MODIFIED SURFACE

(75) Inventors: William E. Mickols, Chanhassen, MN (US); Qingshan Jason Niu, Excelsior, MN (US)

(73) Assignee: Dow Global Technologies LLC, Midland, MI (US)

( * ) Notice: Subject to any disclaimer, the term of this patent is extended or adjusted under 35 U.S.C. 154(b) by 119 days.

This patent is subject to a terminal disclaimer.

(21) Appl. No.: 12/404,642

(22) Filed: Mar. 16, 2009

(65) Prior Publication Data

US 2009/0220690 A1 Sep. 3, 2009

Related U.S. Application Data

(62) Division of application No. 11/380,776, filed on Apr. 28, 2006, now abandoned.

(51) Int. Cl.
*B01D 71/56* (2006.01)
*B01D 71/52* (2006.01)
*B01D 71/00* (2006.01)

(52) U.S. Cl. ......... 210/500.38; 210/500.42; 210/500.27; 427/246

(58) Field of Classification Search .................. None
See application file for complete search history.

(56) References Cited

U.S. PATENT DOCUMENTS

| | | | |
|---|---|---|---|
| 4,277,344 A | 7/1981 | Cadotte et al. | |
| 4,765,897 A | 8/1988 | Cadotte et al. | |
| 4,888,116 A | 12/1989 | Cadotte et al. | |
| 4,950,404 A | 8/1990 | Chau et al. | |
| 4,964,998 A | 10/1990 | Cadotte et al. | |
| 5,091,216 A | 2/1992 | Ekiner et al. | |
| 5,658,460 A | 8/1997 | Cadotte et al. | |
| 5,720,969 A | 2/1998 | Gentile et al. | |
| 5,755,964 A | 5/1998 | Mickols | |
| 5,876,602 A | 3/1999 | Jons et al. | |
| 6,024,873 A | 2/2000 | Hirose et al. | |
| 6,280,853 B1 | 8/2001 | Mickols | |

(Continued)

FOREIGN PATENT DOCUMENTS

JP 03-284333 12/1991

(Continued)

OTHER PUBLICATIONS

Belfer, et al., "Surface modification of commercial composite polyamide reverse osmosis membrane", Journal of Membrane Science 139 (1998) 175-181.\*

(Continued)

*Primary Examiner* — Krishnan S Menon
(74) *Attorney, Agent, or Firm* — Edward W. Black

(57) ABSTRACT

Composite membranes that exhibit long-term resistance to biofouling comprise a porous support and a crosslinked polyamide discriminating layer having an external surface, the discriminating layer comprising a branched poly(alkylene oxide) (PAO) polymer attached to its external surface. The branched PAO polymer typically has the structure of a molecular comb or brush, and is made by polymerization of a PAO macromonomer of the following formula:

$$RO-[(CHR')_n-O]_m-V$$

in which R is hydrogen or a $C_{1-20}$ aliphatic or aromatic group, V is any group containing a polymerizable site, each R' is independently hydrogen or a short chain alkyl group, n is an integer of 1-6, and m is an integer of 1 to about 200. The α end group can be either polymerized or copolymerized.

8 Claims, 7 Drawing Sheets

U.S. PATENT DOCUMENTS

| | | |
|---|---|---|
| 6,337,018 B1 | 1/2002 | Mickols |
| 6,495,043 B1 | 12/2002 | Heijnen |
| 6,616,982 B2 | 9/2003 | Merrill et al. |
| 6,767,961 B1 | 7/2004 | Wang et al. |
| 6,878,278 B2 | 4/2005 | Mickols |
| 6,878,409 B2 | 4/2005 | Kim et al. |
| 6,913,694 B2 | 7/2005 | Koo et al. |
| 2005/0112312 A1 | 5/2005 | Baumert et al. |
| 2005/0150383 A1 | 7/2005 | Kang et al. |
| 2007/0039874 A1 | 2/2007 | Kniajanski et al. |
| 2007/0175820 A1 | 8/2007 | Koo et al. |
| 2007/0175821 A1 | 8/2007 | Koo et al. |
| 2007/0251883 A1 | 11/2007 | Niu |
| 2008/0269417 A1* | 10/2008 | Belfer et al. .......... 525/185 |

FOREIGN PATENT DOCUMENTS

| | | |
|---|---|---|
| JP | 494725 | 3/1992 |
| JP | 04-367715 A | 12/1992 |
| JP | 11-047567 | 2/1999 |
| WO | 0105887 | 1/2001 |

OTHER PUBLICATIONS

U.S. Appl. No. 12/023,082, filed Jan. 31, 2008, Q. Jason Niu. Et al., (Commonly owned and share at least one common inventor).

U.S. Appl. No. 12/299,849, filed Nov. 22, 2007, Mikcols, et al., (Commonly owned and share at least one common inventor).

U.S. Appl. No. 12/328,241, filed Dec. 4, 2008, Mikcols, William E., (Commonly owned and share at least one common inventor).

S. Belfer et al., Surface Modification of Commercial Composite Polyamide Reverse Osmosis Membranes. Journal of Membrane Science 139 (1998) pp. 175-181.

Neil P. Desai et al., "Solution Technique to Incorporate Polyethylene Oxide and Other Water-soluble Polymers into Surfaces of Polymeric Biomaterials," Biomaterials, 1991, vol. 12 March pp. 114-153.

Thomas Huberm et al, "New Hyperbranched Poly(ether Amides)s Via Nucleophilic Rig Opening of 2-Oxazoline-Containing Monomers", Macromol. Chem. Phys. 200, No. 1., pp. 126-133, 1999.

John A. Frump, "Oxazolines, Their Preparation, Reactions, and Applications", Chemical Reviews, 1971, vol. 71, No. 5, pp. 483-505.

Guodong Kang et al., A Novel Method of Surface Modification on Thin-Film Composite Reverse Osmosis Membrane by Grafting Poly(ethylene Glycol), Polymer 48 (2007) pp. 1165-1170.

Yosang, Yoon, et al., Polmer Electrolyte Membranes Containing Silver Ion for Facilitated Olefin Transport, Macromolecules vol. 33, No. 9, May 2, 2000m pp. 3185-3186.

Sang Wook Kang et al., Effect of Amino Acids in Polymer/Silver Salt Complex Membranes on Facilitated Olefin Transport, J. Membrane Science, 248 (2005) pp. 201-206.

Zhang, Mingfu, et al., Journal of Polymer Science: Part A: Polymer Chemistry, vol. 43, 3461-3481 (2005).

The Dow Chemical Company, Filmtec Membranes: Basics of RO and NF: Principles of Reverse Osmosis and Nanofiltration, Tech Manual Excerpt, 1-4 (2003).

Reeves, Ben, Recent Advances in Living Free Radical Polymerization, 1-14, Nov. 20, 2001.

* cited by examiner

Molecular Weight Distribution of Certain Crosslinkable PEO Brushes Made from the Radical Polymerization of PEO Macromers with AIBN Comparison of Performance of PEO Brush and PEO Macromer Modified Membranes Performance of PEO Brush Modified Membranes Result of Oil/Soap Fouling Experiments Using Elements
Made from PEO Modified Membrane and Commercial Elements Comparison of the Relative Productivity of Element
Made from PEO Modified Membrane and Commercial Elements

COMPOSITE POLYAMIDE MEMBRANE WITH BRANCHED POLY(ALKYLENE OXIDE) MODIFIED SURFACE

This application is a divisional application of U.S. application Ser. No. 11/380,776 filed 28 Apr. 2006. The entire subject matter of U.S. application Ser. No. 11/380,776 is incorporated herein by reference.

FIELD OF THE INVENTION

This invention relates to membranes. In one aspect, the invention relates to reverse osmosis (RO) membranes while in another aspect, the invention relates to thin-film-composite (TFC) RO membranes. In still another aspect, the invention relates to TFC RO membranes comprising a porous support and a discriminating layer in which the exterior surface of the discriminating layer is chemically modified to reduce or prevent fouling of the membrane during operation. In yet other aspects, the invention is a method of modifying the exterior surface of the discriminating layer of the TFC RO, and a method of using the modified TFC RO.

BACKGROUND OF THE INVENTION

Aromatic polyamide TFC RO membranes are ubiquitous in our daily lives finding application in many industrial areas such as desalting of brine, ultra-pure water production, environmental pollution treatment, and the like. The trend for the next generation of such membranes is to require more sophisticated and specified functions of the polymeric materials from which they are constructed to provide for an overall enhanced performance of the membrane. This, in turn, drives the need for so-called "tailor fit" materials whose functions and properties are precisely tuned for the intended application of the membrane.

Tailor fit materials for RO TFC membranes are available through either (i) design and synthesis of totally new polymers forming the thin film discriminating layer of the RO membranes, or (ii) the physical and/or chemical modification of the thin-film. The former approach has produced TFC RO membranes of enhanced water flux but with an accompanying considerable loss of salt rejection, or vice versa. The latter approach results from one of two routes that involve either (i) the post-treatment of the thin-film surface of the membrane with various chemicals, or (ii) the use of additives during the formation of the thin film.

Regarding post-treatment, a number of RO membranes have been coated with either with polyvinyl alcohol (PVA) or a vinyl acetate homopolymer with self-crosslinking functionality (e.g., Vinac™ available from Air Products Polymers, L.P.). Regarding the use of additives, a number of membranes, particularly nanofiltration membranes, have been prepared with polymer additives that presumably have been incorporated in the membrane. Important improvements to the membrane resulting from modification of the exterior surface of the discriminating layer include stabilizing the discriminating layer during long-term operations, and balancing the improvement of rejection against the loss of flow due to the alteration of the membrane transport characteristics.

FIG. 1 is a schematic representation of a cross-section of a commercially successful RO TFC membrane, e.g., an FT-30 TFC RO membrane by FilmTec Corporation of Edina, Minn. The first or top layer is an ultra-thin barrier or discriminating layer typically comprising a crosslinked polyamide of 10-100 nanometers (nm) in thickness. One method of preparing this layer is by the interfacial polymerization of m-phenylenediamine (MPD) in the aqueous phase and trimesoyl trichloride (TMC) in the organic phase.

The second or middle layer typically comprises an engineering plastic, such as polysulfone, and it typically has a thickness of about 40 microns (μm). This second layer provides a hard, smooth (relative to the third layer) surface for the top layer, and it enables the top layer to perform under high operating pressure, e.g., 10 to 2,000 psi.

The third or bottom layer is typically nonwoven polyester, e.g., a polyethylene terephthalate (PET) web, with a thickness typically of about 120 μm. This third or bottom layer is typically too porous and irregular to provide a proper, direct support for the top layer, and thus the need for the second or middle layer.

The RO TFC membrane is usually employed in one or two different configurations, i.e., flat panel or spiral wound. The flat panel configuration is simply the membrane, or more typically a plurality of membranes separated from one another by a porous spacer sheet, stacked upon one another and disposed as a panel between a feed solution and a permeate discharge. The spiral wound configuration is shown schematically in FIG. 2, and it is simply a membrane/spacer stack coiled about a central feed tube. Both configurations are well known in the art.

From the viewpoint of performance efficiency, TFC membranes are usually required to have dramatically enhanced water permeability without sacrificing salt separability. Such aromatic polyamide TFC membranes with excellent water flux and reasonable salt rejection characteristics are formed by the interfacial reaction of MPD/TMC that have been kinetically altered with organo-metals and non-metals to form complexes of the TMC as taught in U.S. Pat. No. 6,337,018. This (i) reduces the rate of the reaction of the TMC by reducing the diffusion coefficient and use steric hindrance to block MPD from the acid chloride sites, and (ii) complexes the TMC to block water from hydrolyzing the acid chlorides.

Unlike the chemically analogous FT-30 membrane, the kinetically modified version based on MPD/TMC interfacial polymerization results in modification in surface morphology and variation in the polymer chain organization during formation of the thin film. The combined effect is to increase the rejection of the membrane and to allow the use of other process variables to influence the rate of reaction and therefore the membrane performance. This approach allows for an increase to the membrane flux by over 100% in certain products, e.g., FilmTec's XLE membranes, due to the reduced residual acid chloride after interfacial polymerization and improved swelling ability of the resulting thin film, and it gives the possibility of compensating for flow loss in future post-treatment of thin-film surfaces.

Many applications using membrane processes could benefit from the availability of a wide range of polymer chemistries, e.g., they could exhibit better performance, more robustness and less fouling, and they could use less expense polymers. However, due to the uncertainty of new chemistry and the reluctance of companies to invest in the development of new polymers, alternate approaches such as the surface modification of widely used polymers have increased in importance.

One of the goals of research and industry in the RO membrane field is to enhance, or at least maintain, water flux without sacrificing salt rejection over a long period of time in order to increase the efficiency and reduce the cost of the operation. Nevertheless, the main difficulty in accomplishing this goal is fouling that produces a serious flux decline over the operational time of the membrane.

The principal types of fouling are crystalline fouling (mineral scaling, or deposit of minerals due to an excess in the solution product), organic fouling (deposition of dissolved humic acid, oil, grease, etc.), particle and colloid fouling (deposition of clay, silt, particulate humic substances, debris and silica), and microbial fouling (biofouling, adhesion and accumulation of microorganisms, and the formation of biofilms). Various approaches to reducing fouling have been used, and these usually involve pretreatment of the feed solution, modification of the membrane surface properties (e.g., the attachment of hydrophobic or hydrophilic, and/or electronegative or electropositive groups), optimization of module arrangement and process conditions, and periodic cleaning. However, these methods vary widely in applicability and efficiency and this, in turn, has required continuous, on-going efforts to solve these problems.

For polyamide RO TFC membranes, fouling from the formation of biofilm on the surface caused by microorganisms has been regarded as of the uppermost importance. Microorganisms, such as bacteria and viruses, in the water to be filtered, as well as other microscopic material, e.g., protein, adhere to membrane surfaces and grow at the expense of nutrients accumulated from the water phase. The attached microorganisms excrete an extra-cellular polymeric substance (EPS), and this, in combination with the microorganism and protein, form a biofilm. Biofilm formation is believed related to the depletion of residual disinfectant concentration, and that biofilm is not formed from disinfectant-treated water, such as chlorinated water containing a residual of 0.04-0.05 milligrams per liter (mg/L) of free chlorine. However, chlorination, although effective for the destruction of microorganisms, generates harmful byproducts such as trihalomethanes and other carcinogens.

Protein, cell and bacterial fouling of the membrane surface occur spontaneously upon exposure of the membrane surface, i.e., the external surface of the discriminating layer, to physiologic fluids and tissues. In many cases, biofouling is an adverse event that can impair the function of RO membranes. Common strategies for inhibiting biofouling include grafting antifouling polymers or self-assembled monolayers onto the membrane surfaces. Many synthetic polymers have been investigated as antifouling coatings, and these have met with variable success in antifouling tests.

One common and prominent example of a material used to render a surface inert to nonspecific protein adsorption in medical devices is poly(ethylene oxide) (PEO), a linear, flexible, hydrophilic and water-soluble polyether. Self-assembled monolayers (SAMS) presenting oligo(ethylene glycol) (OEG) groups (as in $HS(CH_2)_{11}(EG)_nOH$)) on a gold surface also prevent the adsorption of proteins, even if the number of ethylene glycol (EG) units present is as low as three. Anti-fouling membranes based on grafted, linear polyalkylene oxide oligomers are known, and they provide an improved resistance to fouling while offering excellent flux and salt passage performance (U.S. Pat. No. 6,280,853).

SUMMARY OF THE INVENTION

The present invention provides improved reduced fouling composite membranes and methods for their preparation. In one embodiment, the present invention develops and characterizes new branched poly(alkylene oxide) (PAO) modified TFC RO membranes capable of preventing nonspecific protein adsorption as a means of precluding the formation of biofilms and, hence, reduced fouling. These branched, particularly the highly branched, PAO-modified TFC RO membranes exhibit surprisingly improved stability in fouling, particularly biofouling, environments. Moreover, the membranes of this invention are more thoroughly cleaned under either basic or acidic conditions than linear PAO-modified TFC RO membranes.

In another embodiment, the invention is a composite membrane comprising a porous support and a crosslinked polyamide discriminating layer having an external surface to which are attached crosslinked and branched poly(alkylene oxide) polymers of a relative weight average molecular weight (before crosslinking), as measured by size exclusion chromatography against a linear PEO standard, of at least about 5,000, preferably of at least about 10,000, more preferably between about 20,000 and about 1,000,000, and even more preferably between about 100,000 and about 500,000.

In certain preferred embodiments of the invention, the branched PAO polymers used in the practice of this invention are made from the polymerization of macromonomers of the following formula:

$$RO-[(CHR')_n-O]_m-V \qquad (I)$$

in which V is the α end group, R is the ω end group, each R' is independently hydrogen or a short chain, e.g., $C_{1-3}$, alkyl group, n is an integer of 1-6, and m is an integer of 1 to about 200. Polymerization of the macromonomer occurs through the α end group, and it can be either polymerized or copolymerized with comonomer processes through either V or other α end groups. R is typically a $C_{1-20}$ aliphatic or aromatic group; V is a derivative of any compound containing a polymerizable site, e.g., a group containing a double bond such as a derivative of p- or m-vinyl benzene, or p- or m-vinyl benzoic acid, or methacryloyl chloride, or acryloyl chloride or isopropenyl oxazoline; R' is preferably hydrogen or methyl; n is an integer preferably of 2 or 3; and m is an integer preferably between about 3 and about 50, more preferably between about 7 and about 25. The macromonomers of formula I include both homo- and copolymers and if a copolymer, then random, block and mixed random/block polymers, e.g., PEO macromonomers, poly(propylene oxide) (PPO) macromonomers, and random and block macromonomers based on both ethylene oxide and propylene oxide units. As here used, "copolymer" means a polymer made from two or more monomers.

The branched PAO polymers exhibit three prominent structural features that impart good protein resistance to the external surface of the discriminating layer, i.e., (i) a hydrophilic repeating unit, i.e., a unit that hydrogen bonds with water and is thus water-soluble (it swells in water), (ii) an oligomer side chain that is very flexible due to aliphatic ether bonds, and (iii) a branched, preferably a highly branched, architecture that forms a dense protective layer for the external surface. The "external surface of the discriminating layer" is the surface of the discriminating layer that is in contact with the material, e.g., solution, dispersion, etc., to be filtered and opposite the surface of the discriminating layer that is in contact with the porous support.

DESCRIPTION OF THE PREFERRED EMBODIMENTS

Figure 1:
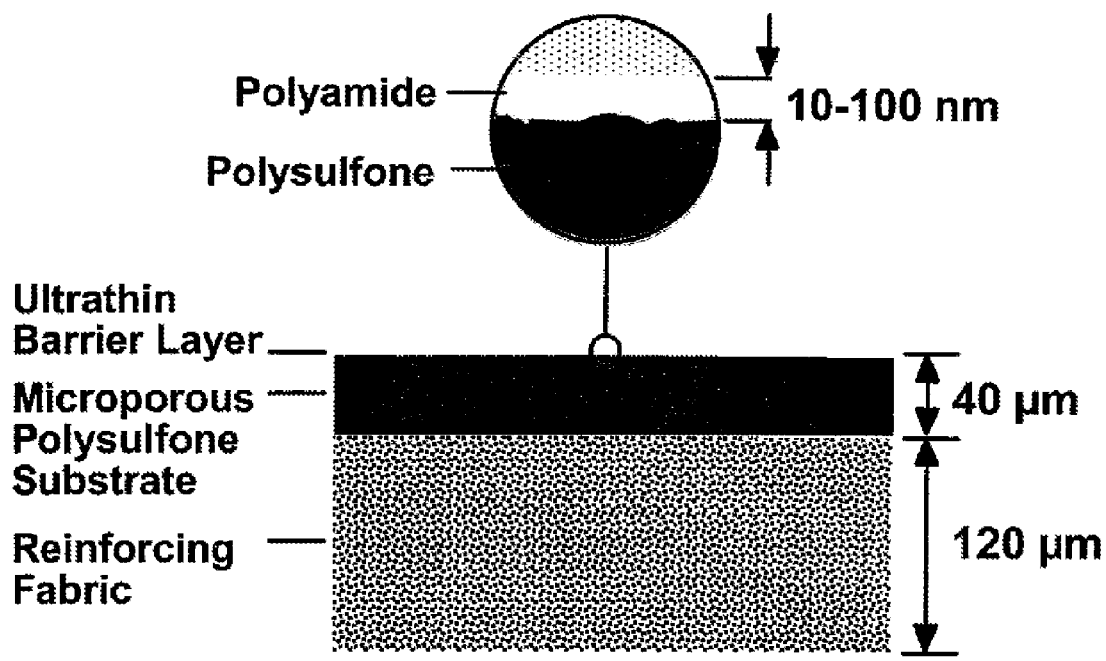
FIG. 1 is a schematic cross-section of a thin film composite membrane.
Figure 2:
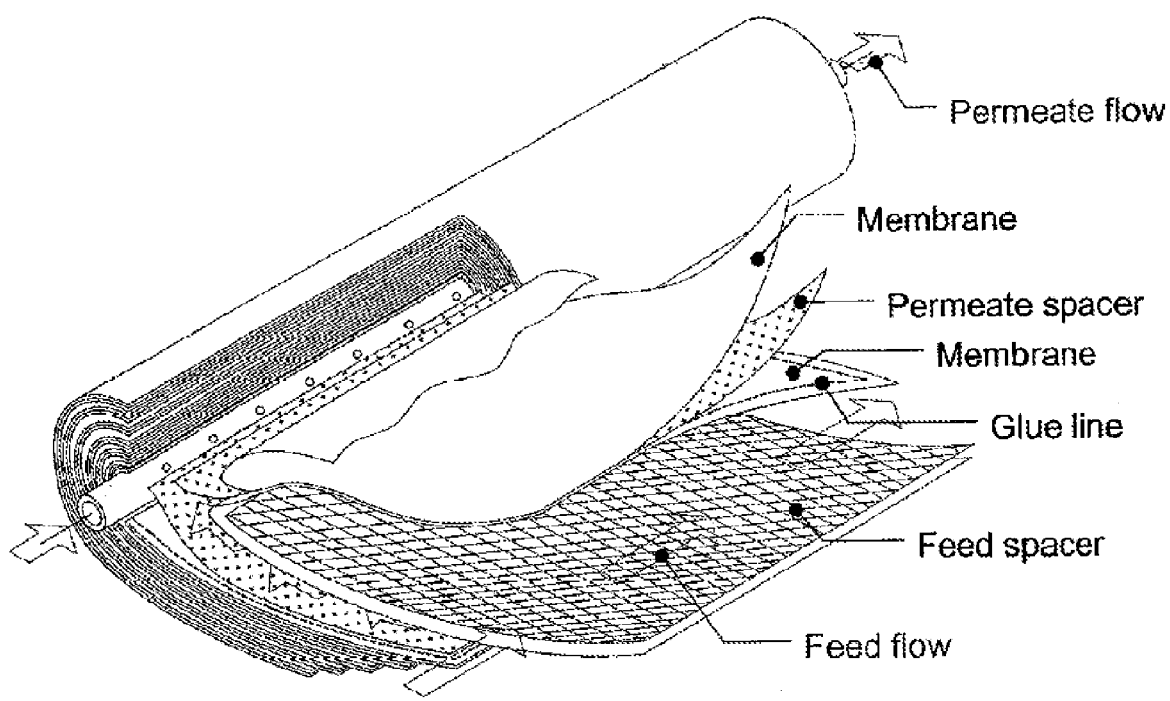
FIG. 2 is a schematic of a TFC membrane in a spiral wound configuration.

"Recovery" means the percentage of membrane system feedwater that emerges from the system as product water or permeate. Membrane system design is based on expected feedwater quality, and recovery is defined through initial adjustment of valves on the concentrate stream. Recovery is often fixed at the highest level that maximizes permeate flow while preventing precipitation of super-saturated salts within the membrane system.

"Rejection" means the percentage of solute concentration removed from system feedwater by the membrane. In reverse osmosis, a high rejection of total dissolved solids (TDS) is important; while in nanofiltration the solutes of interest are specific, e.g., low rejection for hardness and high rejection for organic matter.

"Passage" means the opposite of "rejection". Passage is the percentage of dissolved constituents (contaminants) in the feedwater allowed to pass through the membrane.

"Permeate" means the purified product water produced by a membrane system.

"Flow" means the rate of feedwater introduced to the membrane element or membrane system, usually measured in gallon per minute (gpm) or cubic meters per hour (m$^3$/h). Concentrate flow is the rate of flow of non-permeated feedwater that exits the membrane element or membrane system. This concentrate contains most of the dissolved constituents originally carried into the element or into the system from the feed source. It is usually measured in gpm or m$^3$/h.

"Flux" means the rate of permeate transported per unit of membrane area, usually measured in gallons per square foot per day (gfd) or liters per square meter per hour (l/m$^2$ h).

"Macromonomer" or "macromer" are abbreviations of macromolecular monomer. Macromonomer generally refers to a linear macromolecule possessing a polymerizable group at the chain end. In most cases, the polymerizable group is of a vinyl type; typically a styryl, (meth)acryl, or vinylester group.

"Branched polymer" and similar terms mean a nonlinear polymacromonomers, i.e., a macromonomer comprising a core chain or backbone with one or more side chains or arms extending from it. Polymerization of macromonomers provides a series of model branched polymers, e.g., comb, brush, star and dendritic. While some fluidity in terms exist, comb polymers typically refer to polymers comprising a backbone and one arm depending from each split point, each arm extending in the same direction (assuming a straight, i.e., untwisted, backbone). Brush polymers typically refer to polymers comprising either a backbone with two arms depending from each split point, or a backbone with one arm extending each from each split point but all the arms not extending in the same general direction. Star polymers typically refer to polymers comprising a backbone with three arms extending from a split point, and dendritic polymers (or dendrimers) typically refer to polymers comprising a multifunctional core molecule with a branched wedge attached to each functional site. The branched wedge is normally built stepwise with a regular monomer leading to a mono-disperse, tree-like or generation structure. Generally, homopolymerization of macromonomers affords regular comb polymers of a well-defined structure. Thus, a PEO macromonomer, e.g., $C_1$-PEO-MA, (see Scheme 1) readily polymerizes to give a polymethacrylate with PEO side chains, which are regularly and densely spaced, each on every repeating unit of methylacrylate backbone. Polymer brushes are more fully described by Zhang, M. and Muller, A. H. E. in *Cylindrical Polymer Brushes*, J. Polym. Sci. Part A: Polym. Chem.: 43 (2005), pp. 3461-3481.

"Graft polymers" and like terms mean that a macromonomer was polymerized or copolymerized with other comonomers to form a homogeneous macromolecule. The macromonomers and comonomers are linked via covalent bonds by a free radical mechanism instead of simple blending without reaction.

"Linear polymers" and like terms mean macromers essentially free of branching. As here used, "branching" and like terms mean an arm or side chain attached to a backbone, and the minimum length of the arm is at least as long as the longest monomer from which the backbone is derived. In Scheme 1, the arm or branch is the molecular segment derived from PEO, not the methyl group attached to the backbone that forms a part of the methacrylate monomer from which the backbone is derived.

The composite membranes of this invention include a porous (sometimes called a microporous) support and a relatively thin crosslinked polyamide discriminating layer. In some known embodiments, e.g., the composite membranes of U.S. Pat. No. 6,280,853, linear PEO groups are grafted to the surface of the crosslinked polyamide discriminating layer. In this invention, these PAO groups are in the structure of a branched, preferably a highly branched, polymer, e.g., a comb or brush, and are crosslinked either with surface functional groups or through inter or intra macromolecule reactions. The grafting can be accomplished as a post-treatment on a pre-made membrane, e.g., FT-30 available from FilmTec Corporation, or during membrane fabrication, e.g., just after the initiation of the interfacial polymerization of the polyamine and polyfunctional acyl halide reaction that forms the crosslinked discriminating layer. The manufacture of composite membranes and the surface grafting with PAO groups are well known and are described in, among other places, U.S. Pat. No. 6,280,853.

In one preferred embodiment of this invention, the PAO macromonomer is a macromonomer of PEO. PEO macromonomers with a number average molecular weight (Mn) of about 200 to about 10,000 g/mole are well-known, water-soluble, commercially available nonionic oligomers with a variety of practical applications. They have been the subject of a number of recent publications describing the synthesis of well defined, graft copolymers/brushes by copolymerization with one or more of any of a number of conventional monomers, and regular comb polymers by homopolymerization. One of the most important and interesting features of PEO macromonomers, like other PAO macromonomers, is their amphiphilic nature. These macromonomers are soluble in a very wide range of solvents including water, alcohol, benzene, and even petroleum, depending on the nature of their end groups, R and V, and the PEO chain length m. Such amphiphilicity is not available with conventional monomers, and this makes their polymerization chemistry very facile.

Polymerization of macromonomers provides a series of model branched polymers. In particular, homopolymerization affords regular comb and brush polymers of a well-defined structure. For example, a PEO methacrylate readily polymerizes with free radical initiators, e.g., azobisisobutyronitrile (AIBN), or atom-transfer radical initiators, e.g., (CuBr/2,2-bipyridine/ethyl 2-bromoisobutyrate) in an organic solvent, in water or in bulk to give a poly(methacrylate) with PEO side chains which are regularly and densely spaced, each on every repeating unit of the methacrylate backbone, as shown in Scheme 1.

Scheme 1: Polymer Combs or Brushes derived from PEO Methacrylate Macromonomers.

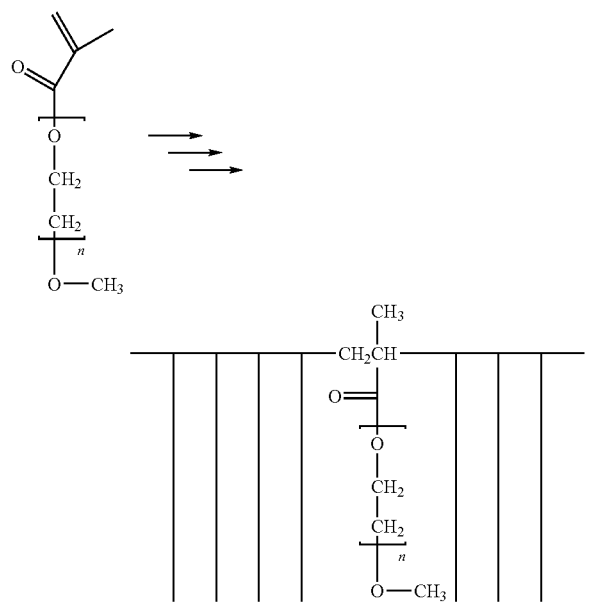

As indicated above, the branched architecture of the film obtained from polymerization of PEO methacrylate is particularly interesting in cases where protein adsorption is to be avoided since this architecture combines both high-density grafting and high PEO segment mobility. Table 1 summarizes the properties of various PEO macromonomers useful for the synthesis of branched, e.g., comb or brush, polymers. All the monomers are widely available from commercial sources. Both the α and ω groups as well as the polymer chain length can be modified to meet various requirements and performance.

TABLE 1

PEO Macromonomers Useful in the Preparation of Branched PEO Polymers

| α Group (Abbreviation) | ω Group | Mn (g/mole) |
|---|---|---|
| Methacryloyl (MA1) | Methyl | 475 |
| Methacryloyl (MA2) | Methyl | 1,100 |
| Acryloyl (AA1) | Methyl | 454 |

Although simple coatings such as linear PVA have been applied to the external surface of the discriminating layer of TFC RO membranes for the improvement of performance, experience has shown that they often wash out and demonstrate a reduction in performance over time. By incorporating crosslinkable groups into the branched polymers, this deficiency can be reduced or eliminated. One common method for incorporating a pendent crosslinkable group into the polymer is by using dual functional comonomers during polymerization. Monomers that contain dual functionality allow for the preparation of unique polymeric structures. One such monomer is 2-isopropenyl-2-oxazoline (IPO), which readily copolymerizes with most commercially useful monomers such as PEO methacrylate via the isopropenyl group, while the oxazoline functionality is capable of both polymerization under acid catalysis and facile coupling via a ring-opening reaction with carboxylic acid. As a consequence, the oxazoline group serves as a crosslinkable group on the external surface of the discriminating layer of the membrane because many TFC RO membranes contain many carboxylic acid functionalities on this surface.

Another useful crosslinking monomer is glycidyl methacrylate (GMA) that can polymerize with a PAO methacrylate, e.g., PEO methacrylate, under free radical conditions to form a branched PAO polymer with pendent epoxy groups (much in the same manner as the formation of epoxy resins). The reactions between oxirane (glycidyl, epoxy) groups and residual amines (MPD) on the surface of membrane form the basis for crosslinked coatings. Still another useful crosslinking monomer is maleic anhydride (MAH). The anhydride group can react with residual amine groups on the external surface of the discriminating layer to form a crosslinked polymer on the surface of membrane.

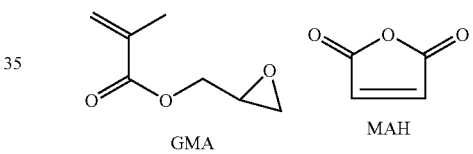

Structure of Glycidyl and MAH Comonomers

Figure 3:
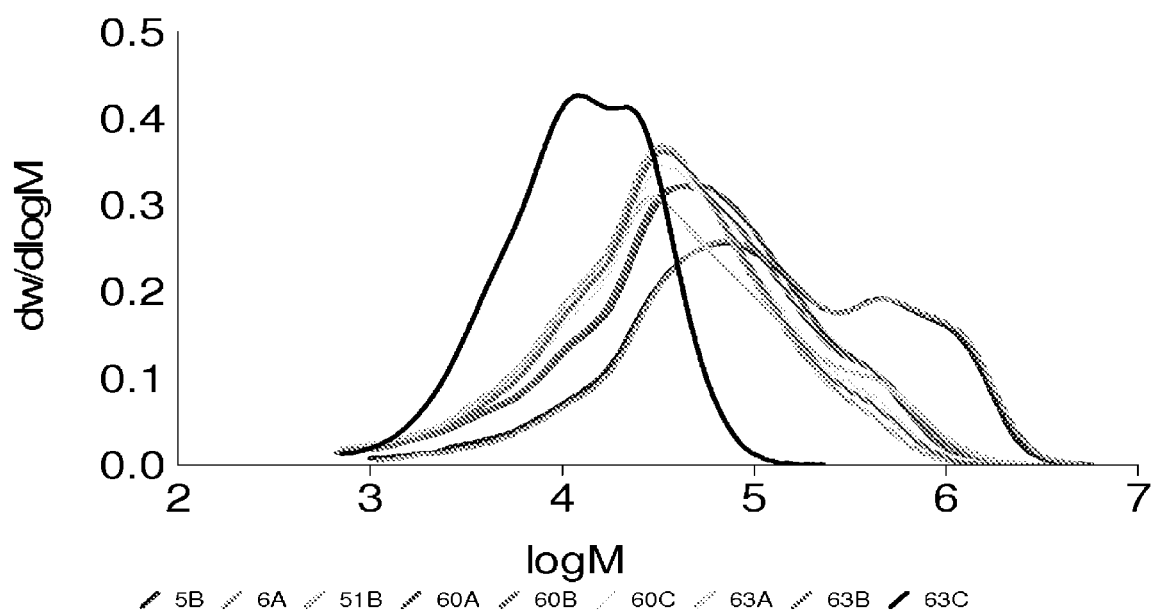
FIG. 3 is a graph reporting the molecular weight distribution of certain crosslinkable PEO brushes made by radical polymerization of PEO macromers with AIBN.

Free radical copolymerization of PAO, e.g., PEO, methyl ether methacrylate with either IPO or glycidyl monomers using AIBN as a radical initiator in dioxane (50% wt of monomers) affords high molecular weight, branched polymers which are still soluble in water. Since IPO and MAH decompose in an aqueous solution, water is not used as polymerization solvent when IPO or MAH are used as the comonomers. The relative molecular weights of branched polymers were measured by size exclusion chromatography (SEC) using narrow poly(ethylene oxide) as a standard, and these are reported in Table 2. The high polydispersity (Table 2 and FIG. 3) of these polymers indicates that they are highly branched. The absolute molecular weight of these macromers could be much higher than reported in Table 2 because such highly branched PEO macromers are more compact in solution than linear PEO macromers.

TABLE 2

Characterization of Branched PEO Made by AIBN Initiator

| Macromonomer | Comonomer | Mn (g/mole) | Mw (g/mole) | Mw/Mn |
|---|---|---|---|---|
| MA1 (100% wt) | None | 13,200 | 112,000 | 8.48 |
| MA1 (92% wt) | GMA (8%) | 13,600 | 87,500 | 6.43 |

TABLE 2-continued

Characterization of Branched PEO Made by AIBN Initiator

| Macromonomer | Comonomer | Mn (g/mole) | Mw (g/mole) | Mw/Mn |
|---|---|---|---|---|
| MA1 (86% wt) | GMA (14%) | 15,800 | 113,000 | 7.15 |
| MA1 (80% wt) | GMA (20%) | 14,000 | 70,500 | 5.04 |
| MA1 (74% wt) | GMA (26%) | 17,300 | 109,000 | 6.30 |
| MA2 (86% wt) | GMA (14%) | 26,500 | 221,000 | 8.34 |
| AA1 (85% wt) | GMA (14%) | 13,100 | 123,000 | 9.39 |
| MA1 (86% wt) | IPO (14%) | 7,860 | 17,500 | 2.23 |
| MA1 (86% wt) | MAH (14%) | 32,700 | 317,000 | 9.69 |

On the other hand, atom transfer radical polymerization (ATRP) of a PAO, e.g., PEO, methyl ether methacrylate can be done in water or in bulk with or without glycidyl methacrylate comonomer. For example, an ATRP formulation in which the transition metal catalyst was CuBr and the ligand was 2,2'-bipyridine was prepared. The initiator 2-bromoisobutyrate is insoluble in water but dissolves in an aqueous PEO methyl ether methacrylate solution at 20 C. Various conditions were examined for this polymerization, and the results are report in Table 3. Compared to AIBN polymerization, ATRP provided good control of the molecular weight and polydispersities (less than 2.0 in most cases). The rate of polymerization in aqueous ATRP at 20 C is markedly faster than conventional ATRP (bulk or in organic solvent) at elevated temperature (65 C). Moreover, under ATRP conditions, high conversion is achieved while residual glycidyl methacrylate at less than 0.05% in most cases after polymerization.

TABLE 3

Preparation of Branched PEO by Atom Transfer Radical Polymerization Using MA1 (89 wt %) and GMA (11 wt %)

| Temperature/Solvent | [M]/[I]* | Mn (g/mole)** | Mw (g/mole) | Mw/Mn |
|---|---|---|---|---|
| 65 C./Bulk | 212 | 41,000 | 87,700 | 2.14 |
| 65 C./Dioxane (33%) | 180 | 34,900 | 56,800 | 1.63 |
| 65 C./Water (33%), crude | 197 | 38,900 | 84,200 | 2.16 |
| 65 C./Water (33%), purified | 197 | 43,900 | 86,300 | 1.97 |
| 20 C./Water (33%) | 197 | 41,200 | 78,700 | 1.91 |
| 20 C./Water (50%) | 212 | 43,900 | 102,000 | 2.32 |
| 20 C./Water (33%) | 115 | 24,100 | 37,600 | 1.56 |

*[M]/[I] means monomer/initiator.
**Measured by SEC in dimethylformamide using linear narrow molecular weight PEO as the standard In the examples reported below, size exclusion chromatography (SEC) was used to provide relative weight average molecular weight data for the branched PEO polymers. The experimental procedure was as follows:

Sample Prep: The solutions were prepared by placing approximately 0.04 grams of sample in 10 ml of the N,N-Dimethylformamide containing 0.4 w/v % $LiNO_3$. The target polymer concentration in the final DMF sample solution was 2 mg/mL. The solutions were shaken for about 4 hours and filtered through an Alltech 0.2 micron (μm) Nylon filter with a syringe prior to injection.

Pump: Waters model 2695 separations module at a nominal flow rate of 1.0 mL/min.

Eluent: Fisher ACS certified dimethylformamide containing 0.4 w/v % $LiNO_3$, vacuum degassed in line.

Injector: Waters model 2695 separations module set to inject 50 microliters of sample.

Columns: Two Polymer Laboratories 10 Mm Mixed-B at 50° C.

Detection: Waters 410 DRI with a sensitivity of 128, scale factor of 1, and temperature of 50° C.

Data system: Polymer Laboratories Calibre GPC/SEC, acquisition version 6.0 and re-analysis version 7.04.

Calibration: The calibration was determined using narrow molecular weight polyethylene oxide standards from Polymer Laboratories over the range of 960 to 1,169,000 g/mole.

Yau, W. W., Kirkland, J. J., and Bly, D. D., *Modern Size Exclusion Liquid Chromatography*, John Wiley &Sons, NY, 1979 provide a general description of the SEC method.

SPECIFIC EMBODIMENTS

Preparation of Membranes

FT-30 reverse osmosis composite membranes were prepared on a FilmTec Corporation pilot coater in a continuous process. First the MPD was applied in water to the pre-made microporous polysulfone support including the backing non-woven fabric, and then the support was drained and nip rolled to remove the excess aqueous solution. The top surface of the support was sprayed with a solution of TMC in Isopar L (available from ExxonMobil Corp.).

At the oil water interface the polyamide was formed. The first coating was made with a MPD solution of 2.0 to 4.0%, and the second coating was made with a TMC concentration of 0.13% (5 mM). The TMC solution also included a molar stoichiometric ratio of TBP (tributyl phosphate) to TMC of 1:1. The membrane traveled first through a room temperature water bath after application of the second coating, then through a 98 C bath that contained 3.5% of glycerin. At this stage, a layer of PEO brush was coated onto the surface of membrane by contact with a coating roller, and the membranes were dried through an air floatation dryer at a temperature of 95 C. The test was done according to standard test conditions of 150 psi and 2000 ppm NaCl for the BW membranes.

Post-Treatment of XLE Membranes

XLE BW RO membranes were obtained from FilmTec Corporation. Aqueous treatment solutions were prepared by heating the appropriate quantity of water at 75 C unless otherwise noted, followed by the addition of an appropriate quantity of either poly(ethylene oxide) (PEO) brushes with different weight average molecular weights (Mw). The membranes were submerged in the PEO brush solution for a given time. The membranes were then tested utilizing an aqueous test solution containing approximately 2,000 ppm at a cross-membrane pressure of 150 psi.

Synthesis of PEO Brushes by AIBN Initiator

In a 250 ml round flask was added 34.4 g of poly(ethylene glycol) methyl ether methacrylate (average Mn ~475), 5.6 g of glycidyl methacrylate, 40 g of dioxane and 1.0 g of AIBN. The resulting mixture was purged with argon for 15 minutes, and then heated under argon for 8 hours at 75 C. SEC analysis confirmed the formation of polymer brushes with an Mw of 113,000 g/mole (Mw/Mn=7.15) based on narrow molecular weight polyethylene glycol standards. This polymer solution was used without purification.

Synthesis of PEO Brush by ATRP

In a small ACE Diels-Alder reaction tube was added 29.2 g of poly(ethylene glycol) methyl ether methacrylate (Mn ~475 g/mole), and 3.6 g of glycidyl methacrylate. The mixture was purged with argon for 5 minutes before 104 mg of CuBr, 226 mg of 2,2'-bipyridine (also know as α,α'-dipyridyl from Aldrich) were added. The solution immediately became brown, indicating formation of Cu(I)-2,2'-dipyridyl complex. With continuing purging of argon, 80 mg of ethyl 2-bromoisobutyrate initiator was added and the solution was sealed with a Teflon cap. After heating the mixture at 65 C for 7 hours in an oil bath, a viscous polymer was obtained. SEC analysis showed that this polymer had a Mn of about 41000 g/mole with a polydispersity of 2.1. Dissolving it in THF and then precipitating into ether isolated the resulting polymer.

Figure 4:
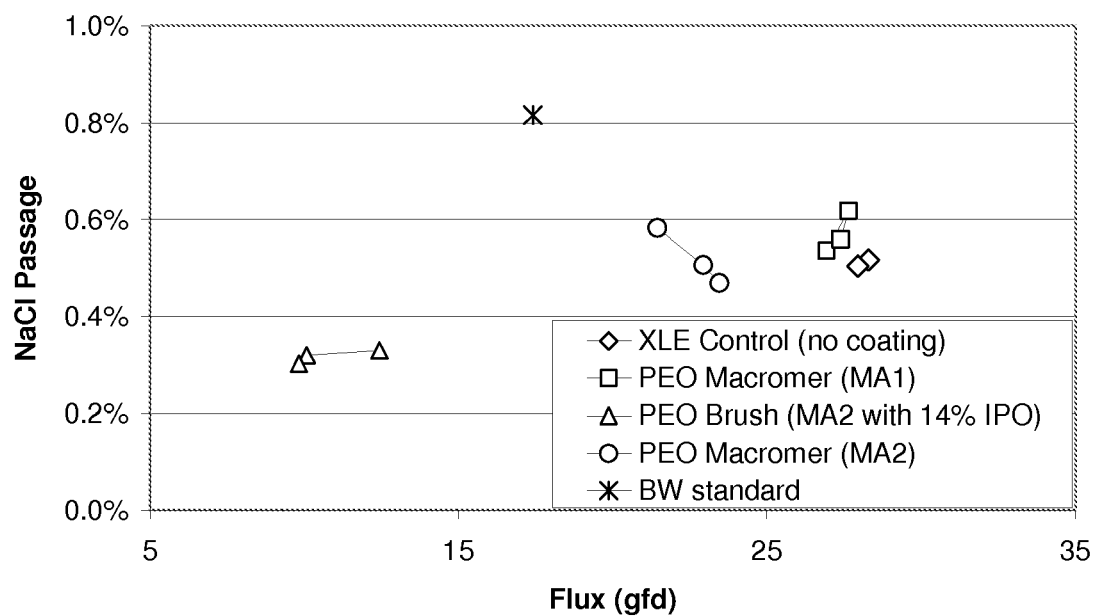
FIG. 4 is a graph reporting a comparison of flux and salt passage between a branched PEO-modified membrane (PEO Brush, MA2) and two linear PEO-modified membranes (the PEO Macromers, MA1 and MA2).
Figure 5:
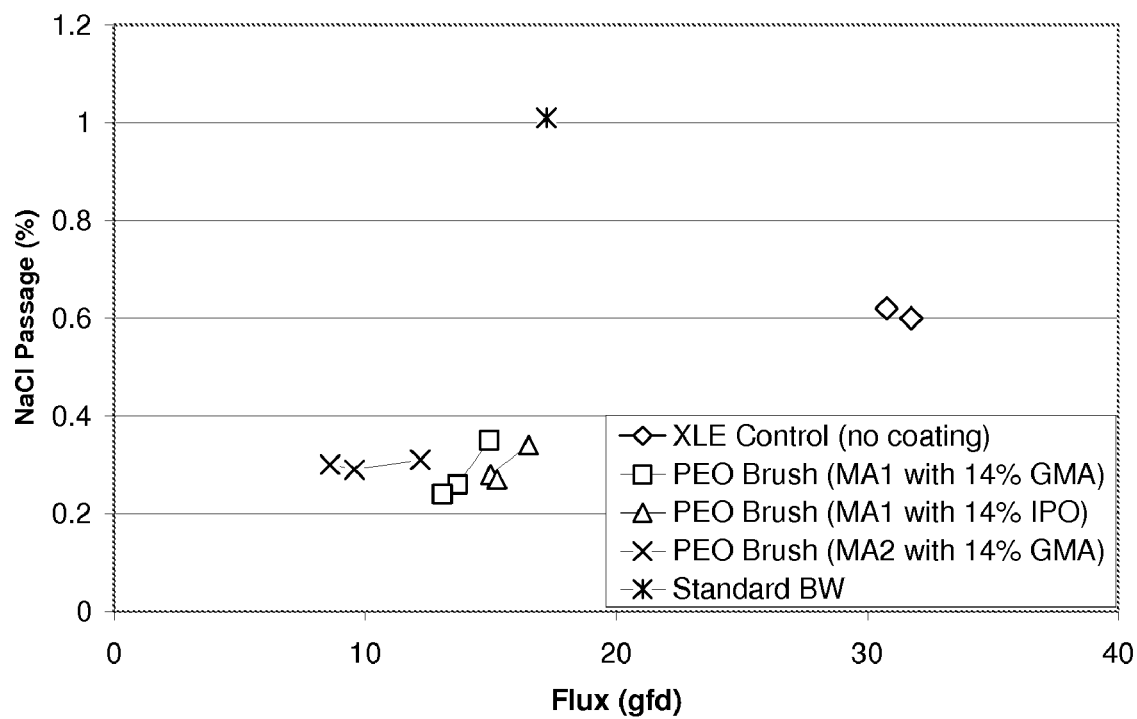
FIG. 5 is a graph reporting flux and salt passage of several membranes prepared by surface modification with branched PEO polymers.

Performance of PEO Brush Modified Membranes:

The performance of various polyamide membranes based on surface modification from PEO brushes are shown in FIGS. 4 and 5, and all the membranes were made using FilmTec's pilot plant technology. FIG. 4 shows the performance (flux and NaCl passage at 0.2, 0.4 and 0.6% aqueous solution concentrations) of an uncoated membrane (XLE Control), a standard brackish water membrane coated with PVA (BW Standard), two membranes coated with linear PEO macromers (PEO Macromers with Mn of 475 and 1100, respectively), and a membrane coated with a brush made by the copolymerization of a PEO macromer (Mn of 1100) with an IPO monomer (14 wt %). The water flux decreased while the salt passage remained essentially level as the PEO macromonomer weight increased. However, when the PEO brush was coated on the membrane surface, the salt passage was greatly improved with a decrease in water flux. This was probably due to the surface coverage of PEO because a high molecular weight polymer tends to stay on the surface longer than does a low molecular weight polymer. Moreover, viscosity plays an important role in the application of the PEO because an increased amount of PEO can be applied to the surface if it has a relatively high viscosity, and this reduces the fraction between the coating roller and the membrane. In addition, PEO macromonomers contain methacrylate as pendent reactive groups while PEO brushes contain IPO as crosslinkable groups, and such a structural difference influences the coverage of the membrane surface. For all the membranes, the BW Standard gave the worst salt passage while the PEO brush membrane gave the best salt passage.

FIG. 5 shows the flux and NaCl passage at 0.2, 0.4 and 0.6% aqueous solution concentrations of several other membranes prepared by surface modification of PEO brushes. High flux is observed in the case of the XLE control, as expected. When the XLE control membrane is coated with a PEO brush, the flux decreased dramatically, and it reached the flux level of a standard BW membrane. However, the salt passage of these coated membranes was at the level of 0.3% at 150 psi tested pressure and 2000 ppm NaCl that is only ⅓ of the BW membrane. Overall, the BW Standard membrane has essentially similar flux but a much lower salt passage based on the surface modification of high flux XLE membranes. Given the similar repeat units of PEO brushes, longer chain PEO brushes offer improvement of salt passage but decrease of flux.

In addition, the effect of glycidal methacrylate (GMA) concentration on the performance of PEO brush modified BW membranes was evaluated. The results are shown in Table 4 and as reported there, PEO brush with less GMA during polymerization gives better salt passage. More GMA increases the salt passage and reduces the flux. The optimum is around 10% GMA. At the same concentration of comonomers, IPO (oxazoline) containing PEO give worse salt passage than that of GMA containing PEO brush. Compared to standard BW control and XLE control, membranes coated with PEO brushes cut the salt passage by 2 to 5 fold. In order to obtain efficient surface modification, the concentration of PEO brushes has to be around 0.3%. This is also a dramatic decrease given that the concentration of PVA in the surface modification for the preparation of BW membranes is around 1%.

TABLE 4

Effect of GMA on the Performance of PEO Brush Modified Membranes*

| Sample Name | Flux | SP (NaCl), % |
|---|---|---|
| XLE control | 32.58 ± 2.59 | 0.517 ± 0.052 |
| XLE control | 34.51 ± 0.81 | 0.489 ± 0.039 |
| 0.3% PEO brush (no GMA) | 18.97 ± 1.18 | 0.264 ± 0.019 |
| 0.3% PEO brush (8% GMA) | 19.85 ± 1.08 | 0.256 ± 0.049 |
| 0.3% PEO brush (14% GMA) | 18.10 ± 1.87 | 0.252 ± 0.034 |
| 0.1% PEO brush (14% GMA) | 19.84 ± 0.96 | 0.318 ± 0.040 |
| 0.3% PEO brush (20% GMA) | 17.80 ± 1.60 | 0.304 ± 0.055 |
| 0.3% PEO brush (26% GMA) | 15.91 ± 0.72 | 0.307 ± 0.055 |
| 0.3% PEO brush (14% IPO) | 18.69 ± 1.49 | 0.315 ± 0.057 |
| BW control | 22.93 ± 0.42 | 1.080 ± 0.027 |

*The test conditions were 150 psi with 2000 ppm NaCl.

Figure 6:
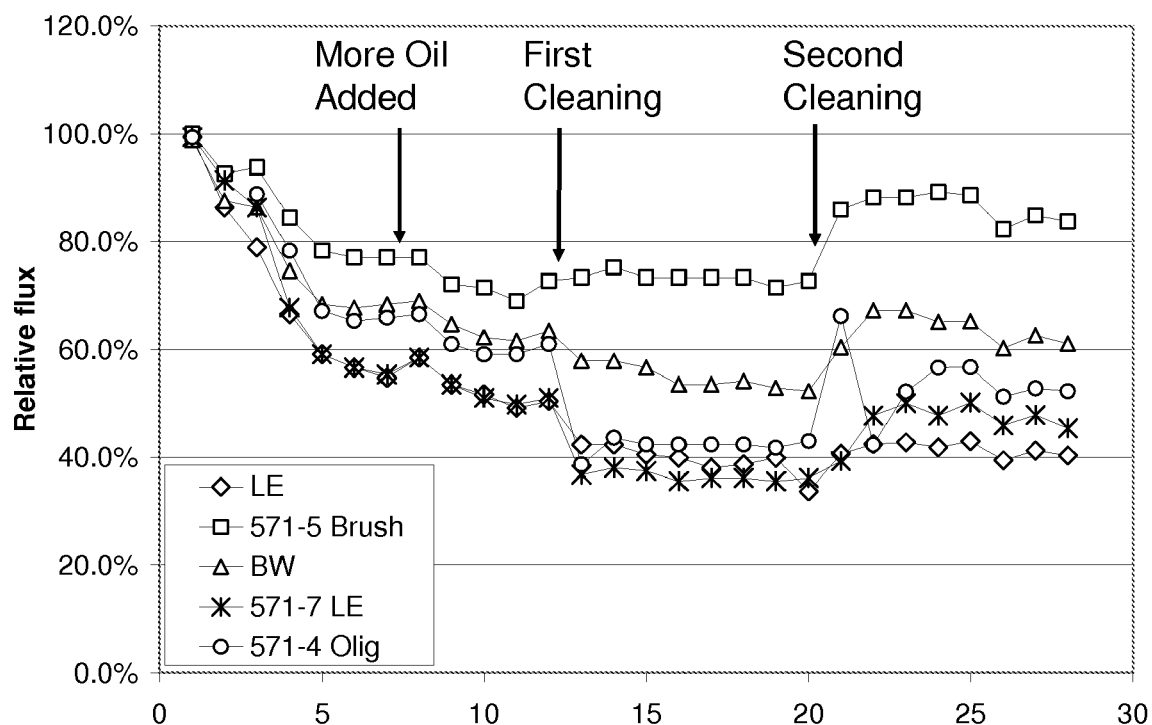
FIG. 6 is a graph reporting the results of an oil/soap fouling experiment comparing a crosslinked, branched PEO-modified membrane of this invention (571-5 Brush) with four commercially available membranes.
Figure 7:
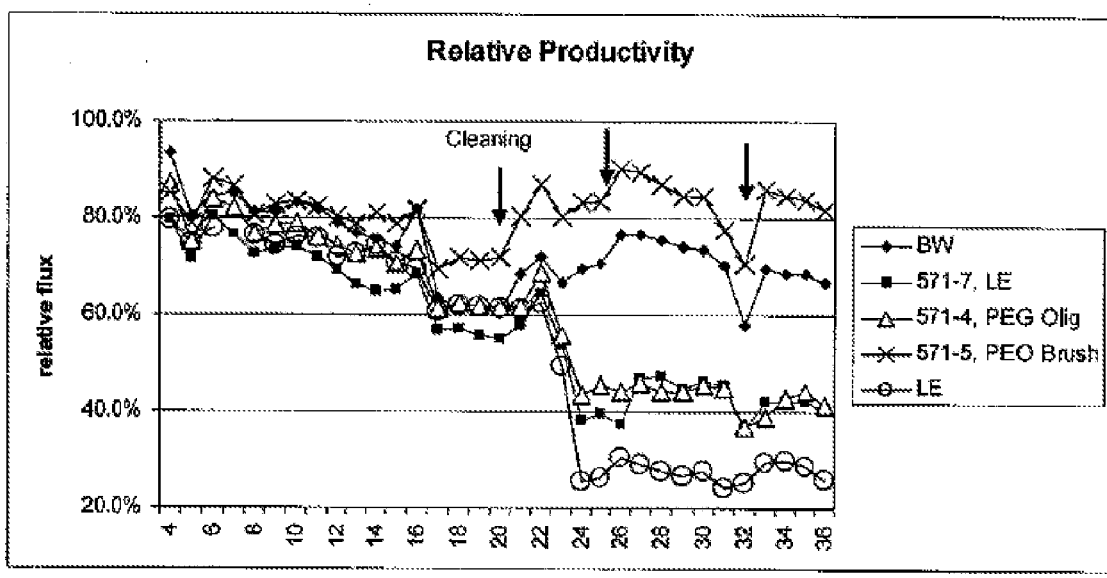
FIG. 7 is a graph reporting a comparison of the relative productivity of an element made from a crosslinked, branched PEO-modified membrane (571-5) with four commercially available membranes.

As discussed above, crosslinked aromatic polyamides made from the in situ interfacial polymerization of MPD in the aqueous phase and TMC in the organic phase are of considerable importance in the development of commercial composite membranes. The salt passage and flux of such XLE membranes can be adjusted by controlling the MPD and TMC concentrations and the ratio of TMC to TBP. This can reduce or eliminate the flow effect on fouling evaluation. For example, by increasing the MPD concentration from the standard 2.4% to 5.0%, the flux can be adjusted from the standard XLE level to half of that level, a level very close to the level of PEO modified membranes. In FIGS. 6 and 7, both the commercial LE and 517-LE membranes were without an extra layer of coating. However, the fluxes were different since 5.0% of MPD was used during the preparation of 517-LE, thus making 517-LE a non-coating standard for direct comparison.

Interactions between the membranes and components in the raw water cause a rapid and often irreversible loss of flux through the membrane. Many studies suggest that natural organic matter (NOM) is the most important foulant. FIG. 6 shows the performance of selected membranes fouled with sodium lauryl sulfate (SLS) and dodecane (a $C_{12}$ hydrocarbon). The tests were run with real elements made from PEO modified surfaces and some commercial elements. As seen from FIG. 6, the percentage of flux retained for PEO brush-modified membranes is much higher than that of the commercial membranes, a clear indication that a PEO surface-modified membrane is capable of resisting NOM fouling. In addition, PEO brush-modified membranes show outstanding performance toward oil/soap fouling and flow recovery after cleaning, while the conventional elements showed very poor performance toward oil/soap fouling.

The ability of PEO modified surfaces to resist bacterial/cell attachment over a long period of time was determined by running the commercial membrane tests under tap water using sodium acetate as bacterial food. The elements were specially designed and fabricated so that all the membranes had similar flux (around 30 gfd at 150 psi and 2000 ppm sodium chloride (NaCl)) thus minimizing the effect of flux.

As shown in FIG. 7, the PEO brush-modified surface exhibited remarkably low levels of cell attachment for over two weeks and thus the flow loss was the lowest among the membranes tested. In contrast, commercial BW membranes show high loss of flow. The flow recovery after membrane cleaning indicates the same trend, i.e., PEO brush membranes perform best due to their antifouling characteristics. Since cell attachment to surfaces is typically mediated by adsorbed extra cellular polysaccharide, the membrane coated with PEO brush has very low extra cellular polysaccharide adsorption throughout the course of experiment. This excellent extra cellular polysaccharide resistance is maintained for several weeks, and it can be directly attributed to the chemical composition of the anchoring (surface-active group (epoxy) and antifouling domains (PEO chain). The epoxy groups are believed to react with the residual amino groups from MPD, forming a robust anchor for the antifouling (PEO chain) portion of the polymer. These groups are stable to strong acid (e.g., a pH of 2.0) and strong base (e.g., pH of 13) cleaning.

Moreover, FIG. 7 shows that the membranes of this invention can be readily cleaned. The comparison membranes, particularly the membrane surfaced modified with a linear PEG oligomer (571-4, PEG Olig), gave an inferior performance from the start of the test.

The design of the PEO side chain and methacrylate backbone adheres to general principle that effective antifouling surfaces require the presence of hydrogen bond acceptors, lake of hydrogen bond donors, a neutral charge, and water solubility. Additional benefits of PEO brushes include readily available starting PEO macromonomers, easy polymerization or copolymerization using AIBN, and virtually unlimited compositional versatility obtained through both methacrylate functional comonomers and modification of resulting copolymers. These new synthetic PEO brush based antifouling polymers provide long-term control of surface biofouling of membranes in the physiologic, marine and industrial environments.

Polymer design for the surface modification of RO membranes for reduced membrane fouling is important. The synthesis of PEO brushes from PEO methacrylate and a functional comonomer (epoxy, maleic anhydride, oxazoline, etc.) is a technique that is very well suited for making crosslinkable macromolecules for the hydrophilic coating on FT-30 type membranes. These PEO brushes, which have a comb or brush like architecture, are very efficient in preventing the formation of biofilms, and such novel PEO-based antifouling polymers can provide long-term control of surface biofouling in the physiologic, marine and industrial environments.

Although the invention has been described in considerable detail, this detail is for the purpose of illustration. Many variations and modifications can be made on the invention as described above without departing from the spirit and scope of the invention as it is described in the appended claims. All U.S. patents and allowed U.S. patent applications are incorporated herein by reference.

What is claimed is:

1. A method of preparing a composite membrane comprising a porous support and a crosslinked polyimide discriminating layer having an external surface to which are attached branched poly(alkylene oxide) polymers;

the method comprising the step of coating the external surface of the discriminating layer with branched poly (alkylene oxide) polymers, wherein a branched poly (alkylene oxide) polymer comprises a backbone with poly(alkylene oxide) side chains, and where the polymer is derived from poly(alkylene oxide) macromonomers represented by formula (I):

$$RO-[(CHR')_n-O]_m-V \qquad (I)$$

wherein R is hydrogen or a $C_{1-20}$ aliphatic or aromatic group, V is any group including a polymerizable site, each R' is independently hydrogen or a $C_{1-3}$ alkyl group, n is an integer of 1 to 6, and m is an integer of 1 to about 200 and wherein the branched poly(alkylene oxide) polymers comprise copolymers of the poly(alkylene oxide) macromonomers of formula (I) and at least one of: glycidyl methacrylate (GMA), 2-isopropenyl-2-oxazoline (IPO) and maleic anhydride (MAH).

2. The method of claim 1 wherein the branched poly(alkylene oxide) polymers comprise copolymers of the poly(alkylene oxide) macromonomers of formula (I) and glycidyl methacrylate (GMA).

3. The method of claim 1 wherein the branched poly(alkylene oxide) polymers comprise copolymers of the poly(alkylene oxide) macromonomers of formula (I) and 2-isopropenyl-2-oxazoline (IPO).

4. The method of claim 1 wherein the branched poly(alkylene oxide) polymers comprise copolymers of the poly(alkylene oxide) macromonomers of formula (I) and maleic anhydride (MAH).

5. A method of preparing a composite membrane comprising a porous support and a crosslinked polyamide discriminating layer having an external surface to which are attached branched poly(alkylene oxide) polymers;

the method comprising the step of coating the external surface of the discriminating layer with branched poly (alkylene oxide) polymers, wherein a branched poly (alkylene oxide) polymer comprises a backbone with poly(alkylene oxide) side chains, and where the polymer is derived from poly(alkylene oxide) macromonomers represented by formula (I):

$$RO-[(CHR')_n-O]_m-V \qquad (I)$$

wherein V is a derivative of at least one of: p- and m-vinyl benzene, p- and m-vinyl benzoic acid, methacryloyl chloride, acryloyl chloride and isopropenyl oxazoline; R is independently hydrogen or a $C_{1-20}$ aliphatic or aromatic group, R' is independently hydrogen or a $C_{1-3}$ alkyl group, n is an integer of 1 to 6, and m is an integer of 1 to about 200.

6. The method of claim 5 wherein V is a derivative of at least one of: p-vinyl benzene, m-benzene, p-vinyl benzoic acid and m-vinyl benzoic acid.

7. The method of claim 5 wherein V is a derivative of at least one of: methacryloyl chloride and acryloyl chloride.

8. The method of claim 5 wherein V is a derivative of isopropenyl oxazoline.

* * * * *